US009781667B2

(12) United States Patent
Cho et al.

(10) Patent No.: US 9,781,667 B2
(45) Date of Patent: *Oct. 3, 2017

(54) METHOD AND APPARATUS FOR VIDEO COMMUNICATION

(71) Applicant: Samsung Electronics Co., Ltd., Suwon-si, Gyeonggi-do (KR)

(72) Inventors: Hyung-Rae Cho, Seoul (KR); Sun-Ae Kim, Seoul (KR); Ji-Young Kwahk, Gyeonggi-do (KR); Hyun-Joo Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,450

(22) Filed: Mar. 22, 2017

(65) Prior Publication Data
US 2017/0195950 A1 Jul. 6, 2017

Related U.S. Application Data

(63) Continuation of application No. 15/331,244, filed on Oct. 21, 2016, which is a continuation of application (Continued)

(30) Foreign Application Priority Data

Oct. 30, 2009 (KR) ........................ 10-2009-0104523

(51) Int. Cl.
*H04L 29/06* (2006.01)
*H04W 48/18* (2009.01)
(Continued)

(52) U.S. Cl.
CPC .......... *H04W 48/18* (2013.01); *H04B 17/318* (2015.01); *H04M 1/72563* (2013.01);
(Continued)

(58) Field of Classification Search
CPC ...... H04L 65/60; H04W 72/048; H04W 4/02; H04W 72/085; H04W 84/12
See application file for complete search history.

(56) References Cited

U.S. PATENT DOCUMENTS 6,751,204 B1  6/2004  Foti et al.
6,980,810 B1  12/2005  Gerakoulis et al.
(Continued)

FOREIGN PATENT DOCUMENTS

CN  101039236 A  9/2007
CN  101124788 A  2/2008
(Continued)

*Primary Examiner* — Jay P Patel
(74) *Attorney, Agent, or Firm* — Jefferson IP Law, LLP (57) ABSTRACT

A method for changing a communication network for video communication is provided. The method includes performing, by a user equipment (UE), video communication through a mobile communication network; searching for whether there is a wireless local area network (WLAN) accessible by the UE; displaying, if a WLAN accessible by the UE is found, the accessible WLAN; and when the displayed WLAN is selected by a user, changing a communication network for the video communication to perform the video communication through the selected WLAN.

30 Claims, 7 Drawing Sheets

Related U.S. Application Data

No. 15/225,444, filed on Aug. 1, 2016, now Pat. No. 9,609,562, which is a continuation of application No. 14/808,371, filed on Jul. 24, 2015, now Pat. No. 9,413,800, which is a continuation of application No. 12/915,881, filed on Oct. 29, 2010, now Pat. No. 9,094,884.

(51) Int. Cl.

| | | |
|---|---|---|
| *H04B 17/318* | (2015.01) | |
| *H04W 76/04* | (2009.01) | |
| *H04M 1/725* | (2006.01) | |
| *H04W 36/14* | (2009.01) | |
| *H04W 84/12* | (2009.01) | |
| *H04W 88/08* | (2009.01) | |

(52) U.S. Cl.
CPC ......... *H04W 36/14* (2013.01); *H04W 76/045* (2013.01); *H04W 84/12* (2013.01); *H04W 88/08* (2013.01)

(56) References Cited

U.S. PATENT DOCUMENTS

| | | |
|---|---|---|
| 7,082,301 B2 | 7/2006 | Jagadeesan et al. |
| 7,310,527 B2 | 12/2007 | Jagadeesan et al. |
| 7,496,360 B2 | 2/2009 | Sindhwani et al. |
| 7,738,873 B2 | 6/2010 | Jagadeesan et al. |
| 7,751,818 B2 | 7/2010 | Chaskar et al. |
| 7,761,119 B2 | 7/2010 | Patel |
| 7,920,531 B2 | 4/2011 | Gupta et al. |
| 8,005,058 B2 | 8/2011 | Pecen |
| 8,064,911 B2 | 11/2011 | Kim et al. |
| 8,228,876 B2 | 7/2012 | Lim |
| 8,340,065 B2 | 12/2012 | Gupta et al. |
| 8,780,857 B2 | 7/2014 | Balasubramanian et al. |
| 2004/0044887 A1 | 3/2004 | Park et al. |
| 2004/0048612 A1 | 3/2004 | Virtanen et al. |
| 2004/0063426 A1 | 4/2004 | Hunkeler |
| 2004/0137902 A1 | 7/2004 | Chaskar et al. |
| 2004/0203732 A1 | 10/2004 | Brusilovsky et al. |
| 2005/0059400 A1 | 3/2005 | Jagadeesan et al. |
| 2005/0153736 A1 | 7/2005 | Ganton |
| 2005/0176420 A1 | 8/2005 | Graves et al. |
| 2005/0197156 A1 | 9/2005 | Fourquin et al. |
| 2005/0288021 A1 | 12/2005 | Hunkeler |
| 2006/0002319 A1 | 1/2006 | Lee et al. |
| 2006/0105713 A1 | 5/2006 | Zheng et al. |
| 2006/0135150 A1 | 6/2006 | Oh |
| 2006/0187880 A1 | 8/2006 | Choi |
| 2006/0205407 A1 | 9/2006 | Jagadeesan et al. |
| 2006/0245408 A1 | 11/2006 | Lee et al. |
| 2007/0026866 A1 | 2/2007 | Krishnamurthi et al. |
| 2007/0049276 A1 | 3/2007 | Rimoni et al. |
| 2007/0165583 A1 | 7/2007 | Pecen |
| 2007/0218906 A1 | 9/2007 | Melia et al. |
| 2007/0253395 A1 | 11/2007 | Graves et al. |
| 2008/0076428 A1 | 3/2008 | Jagadeesan et al. |
| 2008/0132298 A1 | 6/2008 | Roh et al. |
| 2008/0232298 A1 | 9/2008 | Kim et al. |
| 2008/0307487 A1 | 12/2008 | Choyi et al. |
| 2008/0310612 A1 | 12/2008 | Bloebaum et al. |
| 2009/0135798 A1 | 5/2009 | Pecen |
| 2009/0137247 A1 | 5/2009 | Mok |
| 2009/0161579 A1 | 6/2009 | Saaranen et al. |
| 2010/0068997 A1 | 3/2010 | Dunko |
| 2010/0113020 A1 | 5/2010 | Subramanian et al. |
| 2010/0220697 A1* | 9/2010 | Liu ..................... H04M 1/2535 370/338 |
| 2010/0291863 A1 | 11/2010 | Hsu et al. |
| 2010/0304738 A1 | 12/2010 | Lim |
| 2011/0078627 A1 | 3/2011 | Zheng et al. |
| 2011/0090982 A1 | 4/2011 | Chen et al. |
| 2011/0149937 A1 | 6/2011 | Gupta et al. |
| 2011/0302019 A1 | 12/2011 | Proctor, Jr. et al. |
| 2012/0224507 A1 | 9/2012 | Nelson et al. |
| 2013/0208700 A1 | 8/2013 | Lim et al. |
| 2013/0326356 A9 | 12/2013 | Zheng et al. |

FOREIGN PATENT DOCUMENTS

| | | |
|---|---|---|
| CN | 101142565 A | 3/2008 |
| CN | 101223811 A | 7/2008 |
| CN | 101282264 A | 10/2008 |
| EP | 1596564 A2 | 11/2005 |
| GB | 2410868 A | 8/2005 |
| JP | 2006-229831 A | 8/2006 |
| JP | 2008-206077 A | 9/2008 |
| KR | 10-2006-0093216 A | 8/2006 |
| KR | 10-2006-0114482 A | 11/2006 |
| KR | 10-2007-0024251 A | 3/2007 |
| KR | 10-2008-0056914 A | 6/2008 |
| KR | 10-2008-0095972 A | 10/2008 |
| KR | 10-2009-0058777 A | 6/2009 |
| WO | 2004012468 A1 | 2/2004 |

* cited by examiner

METHOD AND APPARATUS FOR VIDEO COMMUNICATION

CROSS-REFERENCE TO RELATED APPLICATION(S)

This application is a continuation application of prior application Ser. No. 15/331,244, filed on Oct. 21, 2016; which is a continuation application of prior application Ser. No. 15/225,444, filed on Aug. 1, 2016, which issued as U.S. Pat. No. 9,609,562 on Mar. 28, 2017, which is a continuation application of prior application Ser. No. 14/808,371, filed on Jul. 24, 2015, which issued as U.S. Pat. No. 9,413,800 on Aug. 9, 2016; which is a continuation application of prior application Ser. No. 12/915,881, filed on Oct. 29, 2010, which issued as U.S. Pat. No. 9,094,884 on Jul. 28, 2015; and claims the benefit under 35 U.S.C. §119(a) of a Korean patent application filed on Oct. 30, 2009 in the Korean Intellectual Property Office and assigned Serial number 10-2009-0104523, the entire disclosure of each of which is hereby incorporated by reference.

BACKGROUND OF THE INVENTION

1. Field of the Invention

The present invention generally relates to video communications, and, more particularly, to a method and apparatus of changing a communication network or a communication device for video communication during video communications in a user equipment (UE).

2. Description of the Related Art

Recently, with the rapid development of the information society, multi-purpose terminals including various functions in addition to merely transmitting voice, have been developed. Accordingly, a user equipment (UE) having both a function of transmitting/receiving image data and a function of transmitting/receiving voice has been developed. A representative multi-purpose UE is a camera phone.

When a user desires to take and keep a photograph of a certain scene or a subject required for business use, the camera phone allows the user to photograph and store a desired scene or subject in its internal memory. Additionally, the camera phone allows the photographed image to be wirelessly transmitted to another UE, and to be output onto the screen of a personal computer (PC) when the camera phone is connected to the PC. Recently, a technology that enables the user to photograph and transmit his/her own image in real-time to a counterpart through a wireless network to perform video communication has been developed and commercialized.

Generally, a base station (BS) in a wide-area mobile communication network has an advantage in that it has a wide service coverage from several kilometers to several tens of kilometers, and has a disadvantage in that the service fee is high. In contrast, an access point (AP) of a wireless local area network (WLAN) as described in the IEEE 802.11 protocol has advantages in that it provides a data rate higher than that of the wide-area mobile communication network, and low service fees. However, the WLAN has a disadvantage in that the service coverage of an AP is limited to several tens of meters.

Therefore, it is necessary to develop a method for performing video communication through the most appropriate communication network depending on the location of a UE when video communication is performed using the UE.

SUMMARY

Accordingly, the present invention has been made to solve the above-mentioned problems occurring in the prior art.

The present invention provides a video communication method and apparatus for enabling a user equipment (UE) to perform video communication through a wireless local area network (WLAN) when the UE moves into an area in which the UE can access the WLAN during the video communication using the UE, and enabling the UE to perform video communication through a mobile communication network when the UE leaves the area of the WLAN during the video communication through the WLAN. Further, the present invention provides a video communication method and apparatus for enabling a communication device to be changed to another video-communication-capable device or enabling video communication to be performed through a device connected to a home network, during the video communication.

In accordance with an aspect of the present invention, a method for changing a communication network for video communication is provided. The method includes performing, by a UE, video communication through a mobile communication network; searching for whether there is a WLAN accessible by the UE; displaying, if a WLAN accessible by the UE is found, the accessible WLAN; and when the displayed WLAN is selected by a user, changing a communication network for the video communication to perform the video communication through the selected WLAN.

In accordance with another aspect of the present invention, a UE for changing a communication network for video communication is provided. The UE includes a mobile communication unit for performing wireless communication through a mobile communication network; a display unit for outputting various display data generated in the UE; an input unit for receiving an input from a user; a camera unit for photographing an image in real-time during the video communication, the camera unit including a camera; a storage unit for storing various information required for controlling an operation of the UE; and a control unit for controlling a general operation of the UE, searching for whether there is an accessible WLAN during communication through the mobile communication network, displaying, if an accessible WLAN is found, the accessible WLAN, and changing a communication network for the video communication, when the displayed WLAN is selected by the user, to perform the video communication through the selected WLAN.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

An apparatus and method according to an embodiment of the present invention will be described with reference to the accompanying drawings. Additionally, various specific definitions found in the following description, such as specific components and so on, are provided only to help with the general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention unclear.

The present invention provides a method for enabling a user equipment (UE) to use both a wide-area 3$^{rd}$ generation (3G) mobile communication network and a wireless local area network (WLAN) during video communication to compensate for the disadvantages of the wide-area communication network and WLAN and to provide advantages thereof. According to an embodiment of the present invention, when a UE in video communication moves to a WLAN service area (a "hotspot"), a vertical handover is performed from a base station (BS) of a wide-area mobile communication network to an access point (AP) of the hotspot, so that the UE can continuously perform the video communication in the hotspot. Also, when a UE is no longer within an area of a WLAN during video communication using the WLAN, the UE performs a handover to the mobile communication network to perform the video communication through the mobile communication network again.

Also, the present invention provides a method for changing a video communication device with another video communication device during video communication.

Figure 1:
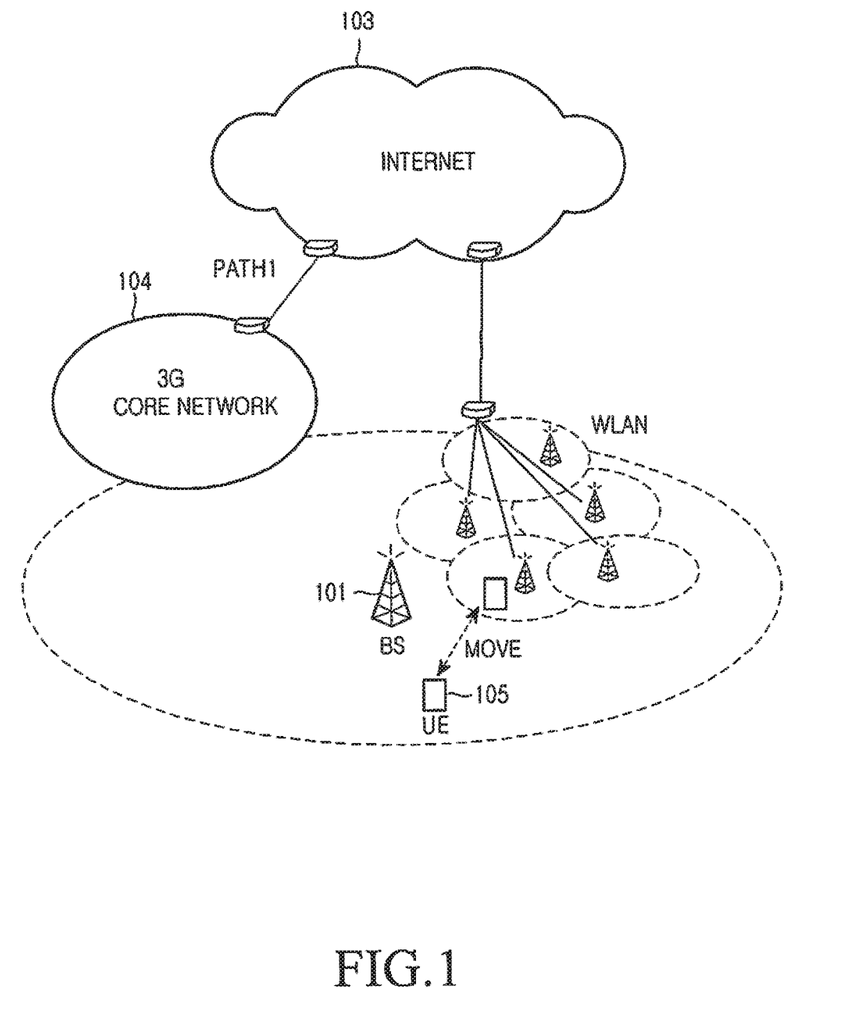
FIG. 1 is a view schematically illustrating a situation where a user equipment (UE) moves from a $3^{rd}$ generation (3G) mobile communication network to a wireless local area network (WLAN) according to an embodiment of the present invention.

FIG. 1 is a view schematically illustrating a situation where a UE moves between a 3G mobile communication network and a WLAN, according to an embodiment of the present invention.

Referring to FIG. 1, when a UE 105 is located outside a hotspot coverage area, the UE 105 performs video communication with another UE through a BS 101 of a wide-area 3G mobile communication network (i.e., core network) 104, a radio network controller (RNC) (not shown), and a mobile switching center (MSC) (not shown). In contrast, when the UE 105 moves and is located within the hotspot coverage area, the UE 105 can perform video communication using a WLAN through an AP. That is, the UE 105 can perform video communication with another UE, which has been connected to the 3G mobile communication network, through paths PATH1, MSC, RNC, and BS of the 3G mobile communication network connected with the Internet 103 via a WLAN. Also, the UE 105 can transmit video communication data to an electronic device connected through a home network, which is based on the digital living network alliance (DLNA) standard, and perform video communication through the electronic device. That is, the user can perform video communication through an indoor electronic device which is connected with the UE 150 through a home network.

Figure 2:
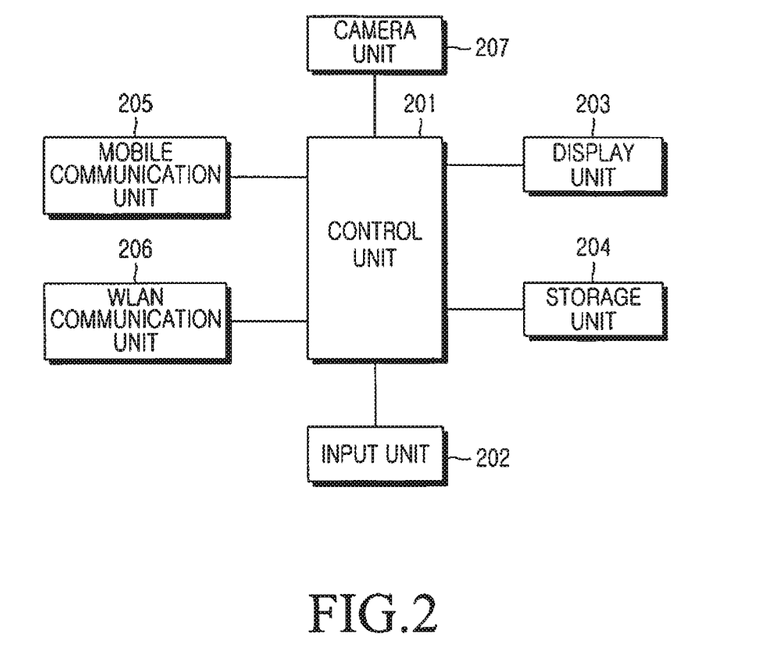
FIG. 2 is a block diagram illustrating the configuration of a UE, according to an embodiment of the present invention.

FIG. 2 is a block diagram illustrating the configuration of a UE according to an embodiment of the present invention.

Referring to FIG. 2, the UE 105 includes a mobile communication unit 205, an input unit 202, a storage unit 204, a camera unit 207, a display unit 203, a WLAN communication unit 206, and a control unit 201.

The mobile communication unit 205 enables the UE 105 to perform wireless communication through a mobile communication network. The mobile communication unit 205 includes an RF transmitter (not shown) for up-converting a frequency of a signal to be transmitted and amplifying the up-converted signal, and an RF receiver (not shown) for low-noise amplifying a received signal and down-converting a frequency of the low-noise amplified signal.

The display unit 203 may be constructed with a liquid crystal display (LCD), and displays various display data generated in the UE 105. When the LCD is implemented in a touch screen type, the display unit 230 may operate as an input means. According to an embodiment of the present invention, when a WLAN, which the UE 105 can access, is found during video communication through a mobile communication network, the display unit 203 may display information for notifying the user of the found WLAN. Additionally, the display unit 203 may display a mobile communication network accessible by the UE 105 when the signal strength of a WLAN becomes weak during video communication through the WLAN, or may display information for notifying the user of a device capable of performing video communication in response to the request of the user when there is a device capable of performing video communication.

The input unit 202 includes keys for inputting numeric and text information, and function keys for setting various functions, and senses an input by the user.

The camera unit 207 includes at least one camera, and photographs an image. According to an embodiment of the present invention, the camera unit 207 controls the camera and photographs an image in real-time when the UE enters a video communication mode under the control of the control unit 201 to be described later.

The storage unit 204 may be configured by a program memory and a data memory, and stores various information required for controlling the operation of the UE 105. According to an embodiment of the present invention, the storage unit 204 may store information, such as a time interval for searching for a WLAN during video communication through the 3G mobile communication network, and may store information on predetermined video-communication-capable devices.

The WLAN communication unit 206 performs WLAN communication through an AP by means of a WLAN.

The control unit 201 controls the general operation of the UE 105. According to an embodiment of the present invention, the control unit 201 allows the UE to perform video communication through a mobile communication network, searches for whether or not there is a WLAN currently accessible by the UE at every predetermined interval, displays the accessible WLAN through the display unit 203 when one is found, and controls video communication to be performed through the displayed WLAN using the WLAN communication unit 206 when the displayed WLAN is selected by the user through the input unit 202.

Also, the control unit 201 performs a control operation to perform video communication through a WLAN, to measure the received signal strength indication (RSSI) of a signal transmitted/received through the WLAN at every predetermined interval, to display one or more mobile communication networks accessible by the UE 105 through the display unit 203 when the RSSI becomes lower than a preset threshold value, and to perform the video communication through a selected mobile communication network using the mobile communication unit 205 when one of the displayed mobile communication networks is selected by the user.

Figure 3:
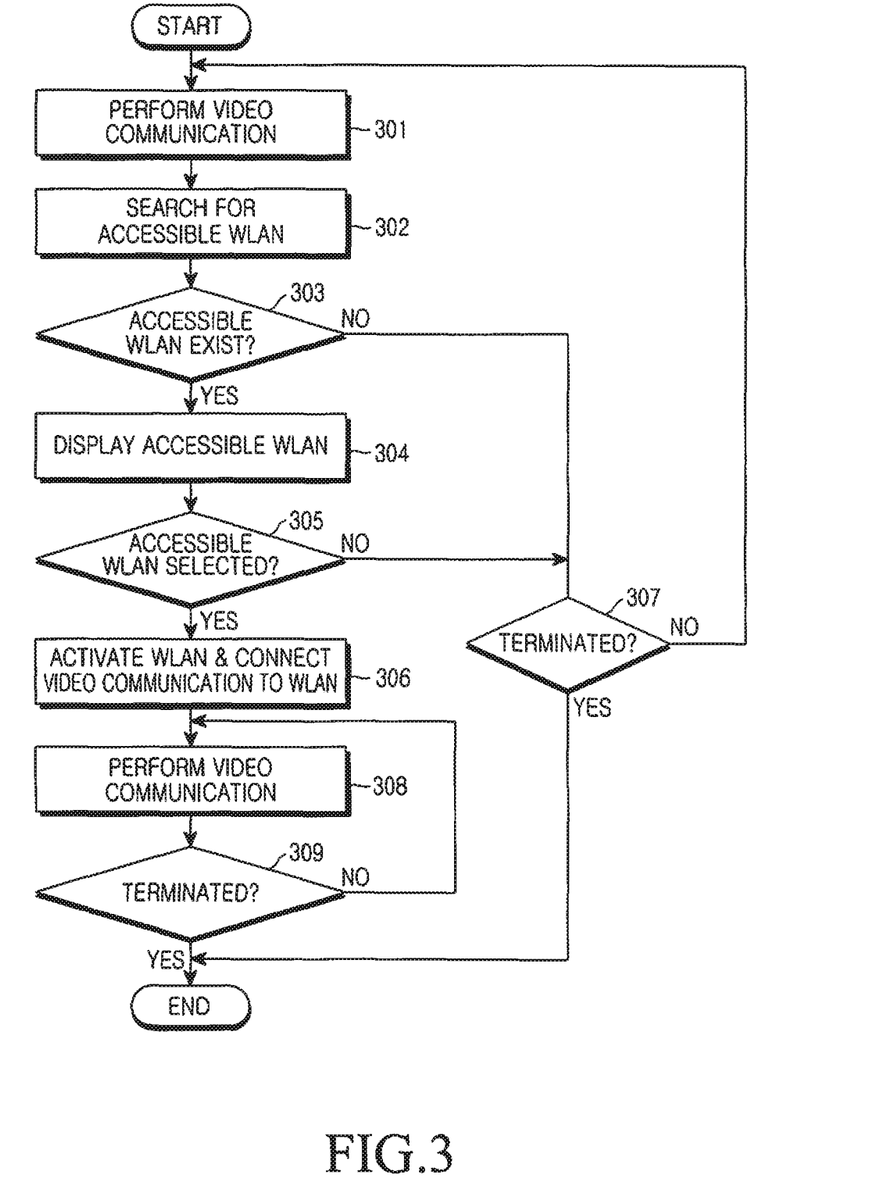
FIG. 3 is a flowchart illustrating the steps of a communication network change operation from a 3G mobile communication network to a WLAN during video communication of a UE according to an embodiment of the present invention.

FIG. 3 is a flowchart illustrating the steps of a communication network change operation from a 3G mobile communication network to a WLAN during video communication of a UE, according to an embodiment of the present invention. Referring to FIG. 3, when the UE 105 performs video communication though a mobile communication network in step 301, the UE 105 searches for a WLAN, which the UE 105 can access, at every predetermined interval in step 302.

In step 302, the UE 105 periodically performs a search for a WLAN. Explaining the WLAN search operation in more detail, the UE 105 may be set to perform the WLAN search operation, regardless of the location of the UE 105. In this case, the UE 105 continuously searches for a WLAN signal at preset periods to perform a search for an accessible WLAN AP.

Also, the UE 105 may be set to perform a search for a WLAN AP only in a case in which the UE 105 is located in a preset position. In such a scheme, the location information of the UE 105 is to be continuously or periodically identified through either a GPS module installed in the UE 105 or through a base station which performs communication with the UE 105, and to perform a WLAN search when the UE 105 enters a preset area. Meanwhile, the UE 105 may be set to perform a WLAN search at preset periods when the UE 105 continuously stays in the preset area.

Additionally, the UE 105 may store access information when the UE 105 accesses a WLAN, and may be set to perform an access to an AP included in previous access history of the UE 105 when a WLAN is searched and the AP included in the previous access history exists. Also, the UE 105 may be set to search for only an AP included in previous access history of the UE 105 when a WLAN is searched.

Generally, the WLAN hotspot area is smaller than the service coverage of the entire wide-area mobile communication network, which may vary depending on area characteristics. Accordingly, the WLAN search interval of the UE 105 may be set appropriately according to the circumstances and location of the UE 105. Meanwhile, a BS 101 in a wide-area mobile communication network, which includes a hotspot, may notify the UE 105 that a hotspot area usable by the UE 105 exists in the service coverage of the BS 101. In this case, the UE 105 may be set to periodically perform a search for finding a hotspot only when the UE 105 has received information that a hotspot area usable by the UE 105 exists in the service coverage of the BS 101 from the BS 101.

In step 303, the UE 105 determines if there is a WLAN accessible by the UE 105 as a result of the search. When it is determined that there is no WLAN accessible by the UE 105 in step 303, the UE 105 proceeds to step 307. When the video communication is not terminated in step 307, the UE 105 proceeds to step 301, in which the UE 105 continues to perform the video communication through the 3G mobile communication network.

Figure 4:
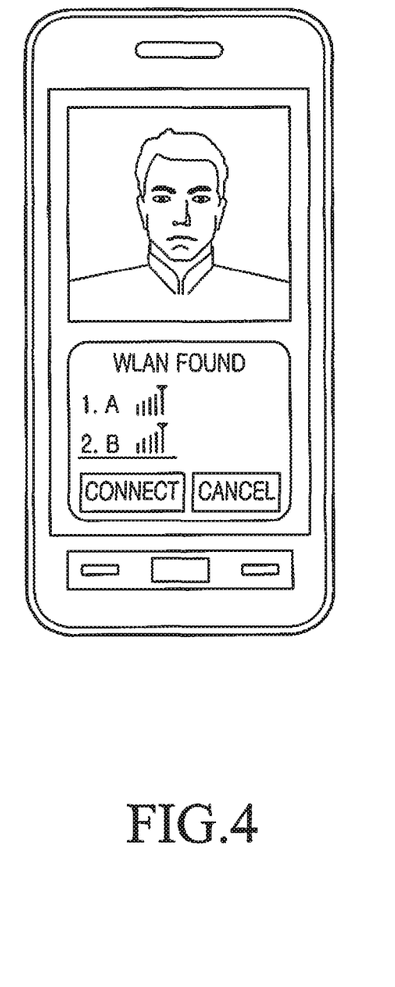
FIG. 4 is a view showing an example in which a UE displays WLANs on its screen when detecting the WLANs during video communication according to an embodiment of the present invention.

In contrast, when it is determined that there is a WLAN accessible by the UE 105 in step 303, the UE 105 proceeds to step 304, in which the UE 105 displays the WLAN accessible by the UE 105. In this case, when a plurality of WLANs is detected, a user interface for enabling the user to select a desired WLAN (i.e., an AP) among the plurality of WLANs is displayed. FIG. 4 is a view showing an example in which a UE displays WLANs on the screen thereof when detecting the WLANs during video communication according to an embodiment of the present invention. As shown in FIG. 4, when finding WLANs accessible by the UE 105 during video communication, the UE 105 may provide the types and signal intensities of the found WLANs through the screen thereof.

Next, in step 305, the UE 105 determines if an accessible WLAN is selected by the user. When it is determined that no WLAN is selected by the user (e.g., when the user cancels the selection) in step 305, the UE 105 proceeds to step 307. When the UE 105 continues to be in communication in step 307, the UE 105 proceeds to step 301, in which the UE 105 continues to perform the video communication.

When the user selects a WLAN to access through a displayed screen, as shown in FIG. 4, in step 305, the UE 105 proceeds to step 306, in which the UE 105 activates the selected WLAN and connects the video communication to the selected WLAN. In this case, when access to the WLAN requires an input of personal information, the personal information may be input in the form of a popup window on the video communication screen so that the UE 105 can access the WLAN. When a network change is generated to perform the video communication through the WLAN, as described above, the transmission path of video communication data of the user is changed such that the video communication data is transferred to the Internet through the WLAN and is transferred to an MSC and RNC of the mobile communication network through the Internet. In contrast, a network change is generated such that the video communication data of a counterpart UE is transferred to the Internet from the mobile communication network including the RNC and MSC and is then transferred to the corresponding WLAN through the Internet. In addition, the UE 105 is allocated an IP for performing communication through the WLAN, and performs a change operation such that the UE 105 can transmit/receive video communication data, which has been transmitted/received through the mobile communication network, through the WLAN.

In step 308, the UE 105 performs video communication through the selected WLAN. If the video communication is terminated in step 309, the operation ends, and, if not, the UE 105 continues to perform steps 308 and 309 of performing the video communication.

Figure 5:
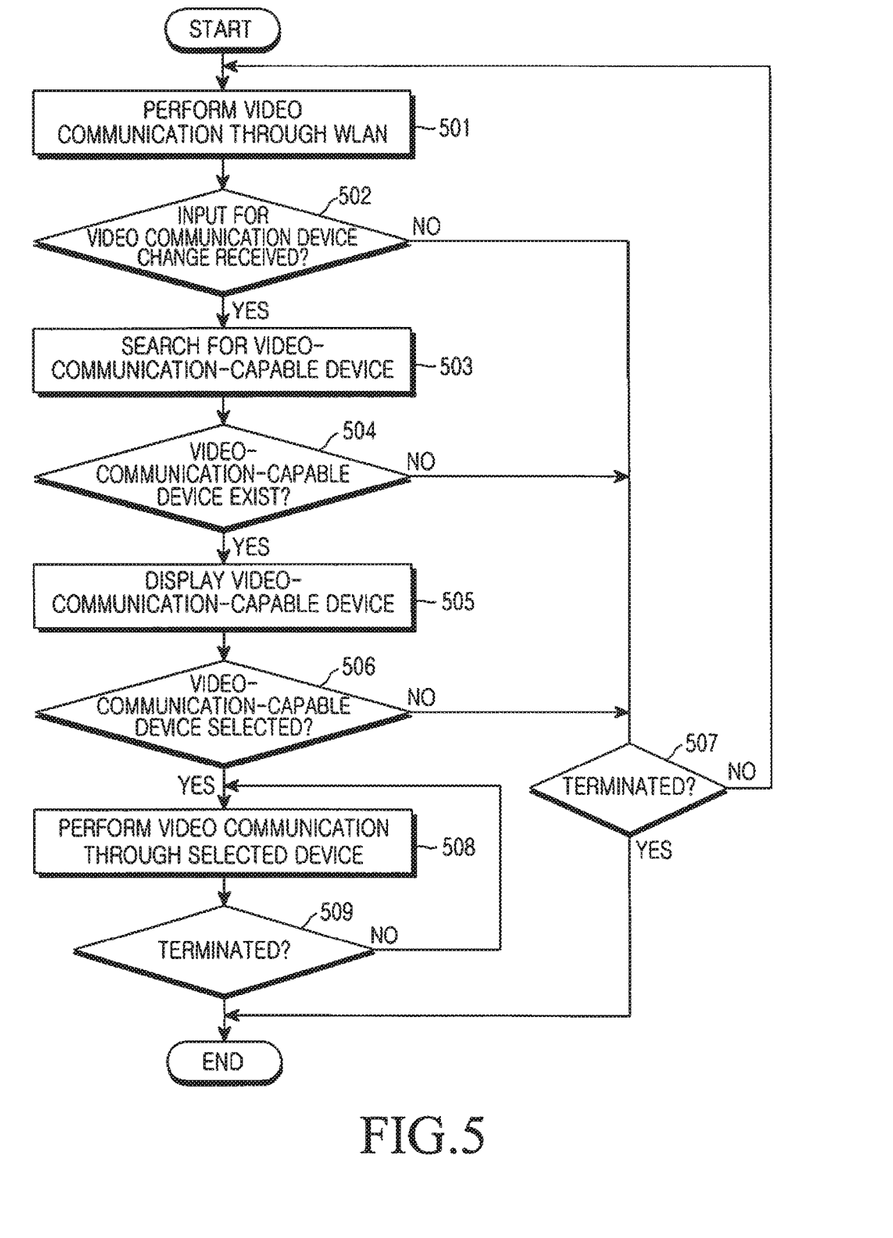
FIG. 5 is a flowchart illustrating the steps of a communication device change operation during video communication of a UE, according to an embodiment of the present invention.

FIG. 5 is a flowchart illustrating the steps of a communication device change operation during video communication of a UE, according to an embodiment of the present invention. Specifically, FIG. 5 illustrates the steps of a communication device change operation to another device capable of performing video communication while video communication is being performed through either a WLAN or through a mobile communication network in an area, such as a home or office, where the WLAN is accessible. According to the present invention, while performing video communication, the UE can transmit video communication data to an electronic device connected through a home network, which is based on the DLNA standard so that the user can perform the video communication through the electronic device.

Additionally, there may be a separate server or controller connected to the WLAN for control operations, such as searching for information on video-communication-capable devices, changing an IP, etc. Additionally, when a home network is configured, the UE may perform operations, such as searching for information on devices capable of performing video communication through a server of the home network, storing the information, changing an IP, and the like.

Moreover, when a video communication device is changed to an another device connected to a mobile communication network, the video communication device may be changed to a preset other video-communication-capable device which has been set by the user in advance.

Referring to FIG. 5, first, when the UE 105 performs video communication in step 501, the UE 105 determines if the UE 105 receives an input for a video communication device change from the user in step 502. When it is determined that the UE 105 did not receive an input for a video communication device change in step 502, the UE 105 proceeds to step 507. When the video communication is not terminated in step 507, the UE 105 proceeds to step 501, in which the UE 105 continues to perform the video communication.

In contrast, when it is determined that the UE 105 receives an input for a video communication device change in step 502, the UE 105 proceeds to step 503, in which the UE 105 searches for a video-communication-capable device. In this case, the UE 105 may perform the search for a video-communication-capable device through the use of a separate server or controller in order to search for a device to perform video communication through a WLAN, as described above. Also, the server or the UE 105 may store information on video-communication-capable devices in advance, and search the stored devices for a connectable device currently connected to a WLAN AP. Also, in order to search for a device to perform video communication through a mobile communication network, the UE 105 determines if there is a device capable of video communication through a mobile communication network which is established by the user in advance.

In step 504, the UE 105 determines if there is a video-communication-capable device as a result of the search. When it is determined that there is no video-communication-capable device in step 504, the UE 105 proceeds to step 507. When the video communication is not terminated in step 507, the UE 105 proceeds to step 501, in which the UE 105 continues to perform the video communication.

Figure 6:
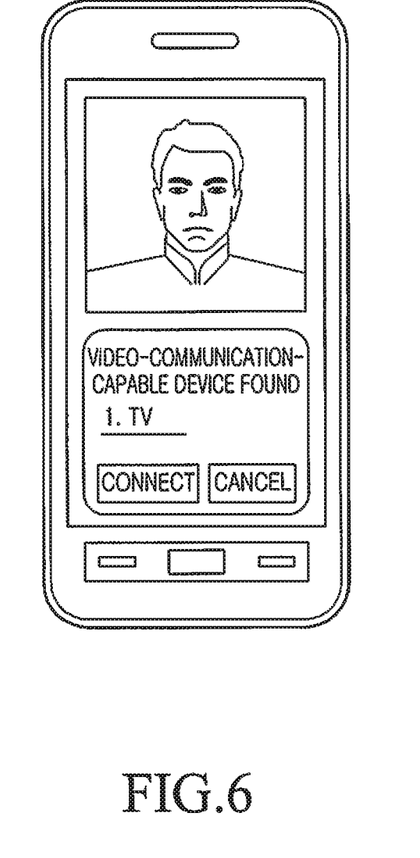
FIG. 6 is a view showing an example in which a UE displays a video-communication-capable device on the screen thereof when detecting the video-communication-capable device during video communication according to an embodiment of the present invention.

In contrast, when it is determined that there is a video-communication-capable device in step 504, the UE 105 proceeds to step 505, in which the UE 105 displays the video-communication-capable device. FIG. 6 is a view showing an example in which a UE displays a video-communication-capable device on its screen when detecting the video-communication-capable device during video communication. As shown in FIG. 6, when finding a video-communication-capable device, the UE 105 may provide basic information, such as the type and name of the found device, through the screen of the UE 105.

Next, in step 506, the UE 105 determines if the video-communication-capable device is selected by the user for switching of the video communication. When it is determined that the video-communication-capable device is not selected (e.g., when the user cancels the selection), the UE 105 proceeds to step 507. When the UE 105 continues to be in communication in step 507, the UE 105 proceeds to step 501, in which the UE 105 continues to perform the video communication.

In contrast, when it is determined that the user selects the video-communication-capable device through the screen shown in FIG. 6 in step 506, the UE 105 proceeds to step 508, in which the UE 105 performs a video communication device change operation so that the video communication can be performed through the selected device. Also, in the case of a UE connected with a home network, the original UE having performed video communication may transmit video communication data to another electronic device connected with the home network to perform the video communication using the other electronic device. In this case, the UE functions as a gateway for video communication.

If the video communication is terminated in step 509, the operation ends, and if not, the UE 105 continues to perform steps 508 of performing the video communication.

The operation of changing video communication devices as described above may be performed simultaneously with a change of communication network for video communication. For example, when the user enters a home while performing video communication through a mobile communication network using his/her own UE outside the house, the user can change the communication network for video communication to an indoor WLAN, and change the video communication device to another device, such as a TV, connected to the WLAN or home network, thereby continuously performing the video communication.

Figure 7:
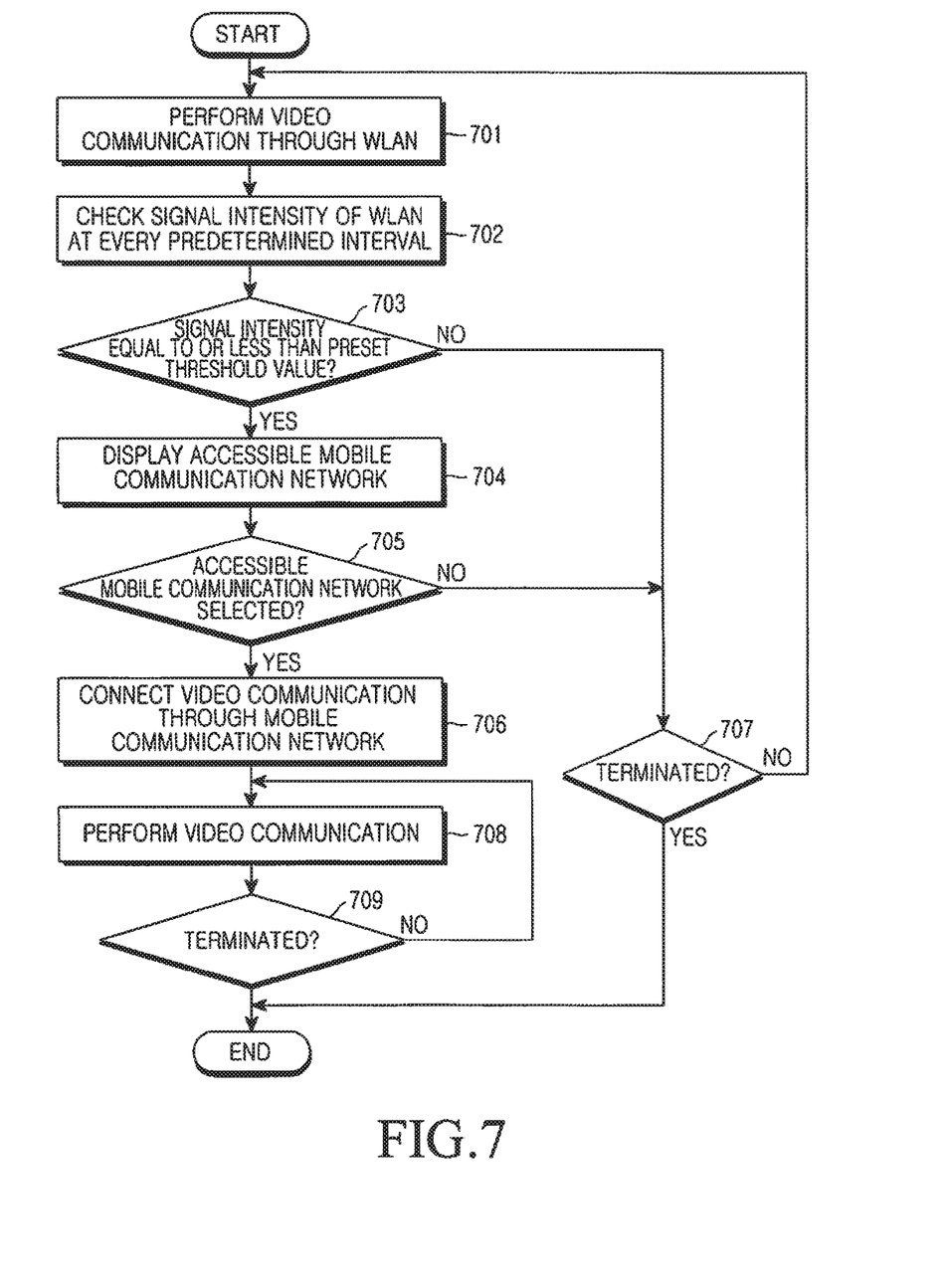
FIG. 7 is a flowchart illustrating the steps of a communication network change operation of a UE from a WLAN to a mobile communication network during video communication according to an embodiment of the present invention.

FIG. 7 is a flowchart illustrating the steps of a communication network change operation from a WLAN to a mobile communication network during video communication of a UE according to an embodiment of the present invention. Referring to FIG. 7, first, when the UE performs video communication though a WLAN in step 701, the UE measures a signal strength of the WLAN at every predetermined interval in step 702.

Next, in step 703, the UE determines if the signal strength measured in step 702 is less than a preset threshold value. Such a signal strength may be measured through the use of a signal-to-noise ratio (SNR) or RSSI. When the measured signal strength is not less than the preset threshold value as a result of the determination, the UE performs step 707, in which the UE determines if the video communication is terminated. When the video communication is not terminated, the UE performs step 701, in which the UE continuously performs the video communication through the 3G mobile communication network.

In contrast, when it is determined in step 703 that the measured signal strength is less than a preset threshold value, the UE performs step 704, in which the UE displays a mobile communication network which is currently accessible by the UE performing the video communication. In this case, a user interface for checking an access to the accessible mobile communication network is displayed.

In step 705, the UE determines if an accessible mobile communication network is selected by the user. When it is determined that the mobile communication network is not selected by the user (e.g., when the user cancels the selection) in step 705, the UE performs step 707. When it is determined in step 707 that the UE continues to be in communication, the UE performs step 701, in which the UE continues to perform the video communication.

When the user selects a mobile communication network to be accessed by the UE in step 705, the UE performs step 706, in which the UE changes the communication network for the video communication to the selected mobile communication network. When the change to perform video communication through a mobile communication network, as described above, is made, the route of video communication data transmitted/received through the WLAN is changed to be transmitted/received through an MSC and RNC of the mobile communication network.

Next, in step 708, the UE performs video communication through the selected mobile communication network. If the video communication is terminated in step 709, the operation ends, and, if not, the UE continues to perform steps 708 of performing the video communication.

According to an embodiment of the present invention, when a UE moves into a WLAN-accessible area during video communication using the UE, the UE can perform the video communication through the WLAN, so that the user can perform video communication using the most appropriate communication network according to the location of the moving UE during the video communication.

Accordingly, in the course of performing video communication using a UE in the outside, when the user moves into a hotspot, such as a home or office, where a WLAN AP exists, the user can perform the video communication through a WLAN, which is lower-priced. Also, since the video communication can be switched to another video-communication-capable device (e.g., an internet protocol (IP) television (TV), a home telephone, etc.), it is possible to implement video communication regardless of place and device. In addition, conversely, even if the user moves to the outside in the course of performing video communication through a WLAN in the house, a communication network for the video communication is changed to the mobile communication network, and a communication device is changed to the UE, so that it is possible to continuously perform the video communication.

The operation and construction of the video communication method and apparatus according to an embodiment of the present invention, can be implemented as described above. While the invention has been shown and described with reference to certain embodiments thereof, it will be understood by those skilled in the art that various changes in form and details may be made therein without departing from the spirit and scope of the invention as defined by the appended claims.

What is claimed is:

1. A method for continually performing video communication by an electronic device switching between heterogeneous networks, the method comprising:
    performing the video communication with an external device using a wireless connection to a mobile communication network by sending video communication data towards the external device through a mobile communication interface of the electronic device and by receiving video communication data originating from the external device through the mobile communication interface of the electronic device, wherein video communication data sent towards the external device includes image data obtained through a camera of the electronic device;
    displaying a video image of the video communication being performed with the external device using the wireless connection to the mobile communication network on a touch screen of the electronic device;
    identifying, by the electronic device, one or more wireless local area networks (WLANs) available at a current location of the electronic device based on a signal received from each of the one or more WLANs while maintaining the wireless connection to the mobile communication network for the video communication;
    based on the identifying of the one or more WLANs while maintaining the wireless connection to the mobile communication network for the video communication, displaying, on the touch screen, one or more user interface items that respectively correspond to the identified one or more WLANs while maintaining the wireless connection to the mobile communication network for the video communication, wherein each of the displayed one or more user interface items allows for selecting a corresponding WLAN through which to perform the video communication with the external device, wherein each of the one or more user interface items includes signal strength information for the corresponding WLAN;
    in response to receiving a first touch input, through the touch screen, for a user interface item of the displayed one or more user interface items while maintaining the wireless connection to the mobile communication network for the video communication, selecting, by the electronic device, a WLAN corresponding to the user interface item;
    in response to receiving a second touch input, through the touch screen, for connecting to the selected WLAN while maintaining the wireless connection to the mobile communication network for the video communication, initiating, by the electronic device, an operation to change a communication network for the video communication from the mobile communication network to the selected WLAN; and
    performing, with the external device using a wireless connection to the selected WLAN to which the communication network for the video communication is changed from the mobile communication network, the video communication by sending video communication data towards the external device through a WLAN communication interface of the electronic device and by receiving video communication data originating from the external device through the WLAN communication interface of the electronic device, wherein video communication data sent towards the external device includes image data obtained through the camera of the electronic device.

2. The method of claim 1, wherein each of the displayed one or more user interface items further comprises at least one of type information or an alphanumeric identifier for a corresponding WLAN.

3. The method of claim 1, wherein, when a plurality of user interface items is displayed, the plurality of user interface items is consecutively displayed one below another.

4. The method of claim 1, wherein the selection of the WLAN is canceled based on an input received while the user interface item corresponding to the WLAN is displayed.

5. The method of claim 1, wherein the second touch input comprises a touch input, received through the touch screen, for a connect option displayed on the touch screen.

6. The method of claim 1, further comprising:
    in response to receiving the second touch input, displaying, on the touch screen, a user interface for obtaining information for connecting to the selected WLAN; and
    connecting to the selected WLAN, through which to send and receive video communication data, using the information obtained through the displayed user interface.

7. The method of claim 1, wherein the video communication has been performed using the mobile communication network until the video communication is performed using the selected WLAN.

8. The method of claim 1, further comprising changing the communication network for the video communication from the selected WLAN to one of the mobile communication network or another mobile communication network based on the electronic device being outside of a service coverage area of the selected WLAN.

9. An electronic device for continually performing video communication by switching between heterogeneous networks, the electronic device comprising:
  a memory storing instructions; and
  a processor configured to execute the stored instructions to at least:
    control to perform the video communication with an external device using a wireless connection to a mobile communication network by sending video communication data towards the external device through a mobile communication interface of the electronic device and by receiving video communication data originating from the external device through the mobile communication interface of the electronic device, wherein video communication data sent towards the external device includes image data obtained through a camera of the electronic device;
    control to display a video image of the video communication being performed with the external device using the wireless connection to the mobile communication network on a touch screen of the electronic device;
    control to identify one or more wireless local area networks (WLANs) available at a current location of the electronic device based on a signal received from each of the one or more WLANs while maintaining the wireless connection to the mobile communication network for the video communication;
    based on the identifying of the one or more WLANs while maintaining the wireless connection to the mobile communication network for the video communication, control to display, on the touch screen, one or more user interface items that respectively correspond to the identified one or more WLANs while maintaining the wireless connection to the mobile communication network for the video communication, wherein each of the displayed one or more user interface items allows for selecting a corresponding WLAN through which to perform the video communication with the external device, wherein each of the one or more user interface items includes signal strength information for the corresponding WLAN;
    in response to receiving a first touch input, through the touch screen, for a user interface item of the displayed one or more user interface items while maintaining the wireless connection to the mobile communication network for the video communication, control to select a WLAN corresponding to the user interface item;
    in response to receiving a second touch input, through the touch screen, for connecting to the selected WLAN while maintaining the wireless connection to the mobile communication network for the video communication, control to initiate an operation to change a communication network for the video communication from the mobile communication network to the selected WLAN; and
    control to perform, with the external device using a wireless connection to the selected WLAN to which the communication network for the video communication is changed from the mobile communication network, the video communication by sending video communication data towards the external device through a WLAN communication interface of the electronic device and by receiving video communication data originating from the external device through the WLAN communication interface of the electronic device, wherein video communication data sent towards the external device includes image data obtained through the camera of the electronic device.

10. The electronic device of claim 9, wherein each of the displayed one or more user interface items further comprises at least one of type information or an alphanumeric identifier for a corresponding WLAN.

11. The electronic device of claim 9, wherein, when a plurality of user interface items is displayed, the plurality of user interface items is consecutively displayed one below another.

12. The electronic device of claim 9, wherein the selection of the WLAN is canceled based on an input received while the user interface item corresponding to the WLAN is displayed.

13. The electronic device of claim 9, wherein the second touch input comprises a touch input, received through the touch screen, for a connect option displayed on the touch screen.

14. The electronic device of claim 9, wherein the processor is configured to execute the stored instructions further to at least:
  in response to receiving the second touch input, control to display, on the touch screen, a user interface for obtaining information for connecting to the selected WLAN; and
  control to connect to the selected WLAN, through which to send and receive video communication data, using the information obtained through the displayed user interface.

15. The electronic device of claim 9, wherein the video communication has been performed using the mobile communication network until the video communication is performed using the selected WLAN.

16. The electronic device of claim 9, wherein the processor is configured to execute the stored instructions further to control to change the communication network for the video communication from the selected WLAN to one of the mobile communication network or another mobile communication network based on the electronic device being outside of a service coverage area of the selected WLAN.

17. A non-transitory computer readable storage medium with instructions stored thereon, the instructions executable by a processor of an electronic device for continually performing a video communication by switching between heterogeneous networks to cause the processor to at least:
  control to perform the video communication with an external device using a wireless connection to a mobile communication network by sending video communication data towards the external device through a mobile communication interface of the electronic device and by receiving video communication data originating from the external device through the mobile communication interface of the electronic device, wherein video communication data sent towards the external device includes image data obtained through a camera of the electronic device;

control to display a video image of the video communication being performed with the external device using the wireless connection to the mobile communication network on a touch screen of the electronic device;

control to identify one or more wireless local area networks (WLANs) available at a current location of the electronic device based on a signal received from each of the one or more WLANs while maintaining the wireless connection to the mobile communication network for the video communication;

based on the identifying of the one or more WLANs while maintaining the wireless connection to the mobile communication network for the video communication, control to display, on the touch screen, one or more user interface items that respectively correspond to the identified one or more WLANs while maintaining the wireless connection to the mobile communication network for the video communication, wherein each of the displayed one or more user interface items allows for selecting a corresponding WLAN through which to perform the video communication with the external device, wherein each of the one or more user interface items includes a signal strength information for the corresponding WLAN;

in response to receiving a first touch, through the touch screen, for a user interface item of the displayed one or more user interface items while maintaining the wireless connection to the mobile communication network for the video communication, control to select a WLAN corresponding to the user interface item;

in response to receiving a second touch input, through the touch screen, for connecting to the selected WLAN while maintaining the wireless connection to the mobile communication network for the video communication, control to initiate an operation to change a communication network for the video communication from the mobile communication network to the selected WLAN; and control to perform, with the external device using a wireless connection to the selected WLAN to which the communication network for the video communication is changed from the mobile communication network, the video communication by sending video communication data towards the external device through a WLAN communication interface of the electronic device and by receiving video communication data originating from the external device through the WLAN communication interface of the electronic device, wherein video communication data sent towards the external device includes image data obtained through the camera of the electronic device.

18. The non-transitory computer readable storage medium of claim 17, wherein each of the displayed one or more user interface items further comprises at least one of type information or an alphanumeric identifier for a corresponding WLAN.

19. The non-transitory computer readable storage medium of claim 17, wherein, when a plurality of user interface items is displayed, the plurality of user interface items is consecutively displayed one below another.

20. The non-transitory computer readable storage medium of claim 17, wherein the selection of the WLAN is canceled based on an input received while the user interface item corresponding to the WLAN is displayed.

21. The non-transitory computer readable storage medium of claim 17, wherein the second touch input comprises a touch input, received through the touch screen, for a connect option displayed on the touch screen.

22. The non-transitory computer readable storage medium of claim 17, wherein the instructions cause the processor further to at least:

in response to receiving the second touch input, control to display, on the touch screen, a user interface for obtaining information for connecting to the selected WLAN; and control to connect to the selected WLAN, through which to send and receive video communication data, using the information obtained through the displayed user interface.

23. The non-transitory computer readable storage medium of claim 17, wherein the video communication has been performed using the mobile communication network until the video communication is performed using the selected WLAN.

24. The non-transitory computer readable storage medium of claim 17, wherein the instructions cause the processor further to control to change the communication network for the video communication from the selected WLAN to one of the mobile communication network or another mobile communication network based on the electronic device being outside of a service coverage area of the selected WLAN.

25. An electronic device for continually performing video communication by switching between heterogeneous networks, the electronic device comprising:

a memory storing instructions; and a processor configured to execute the stored instructions to at least:

control to perform the video communication with an external device using a mobile communication network, the video communication being performed using the mobile communication network comprising sending video communication data towards the external device through a mobile communication interface of the electronic device and receiving video communication data originating from the external device through the mobile communication interface of the electronic device, wherein video communication data sent towards the external device includes image data obtained through a camera of the electronic device;

control to display a video image of the video communication being performed with the external device using the mobile communication network on a touch screen of the electronic device;

control to identify one or more wireless local area networks (WLANs) available at a current location of the electronic device based on a signal received from each of the one or more WLANs during the video communication being performed using the mobile communication network;

based on the identifying of the one or more WLANs during the video communication being performed using the mobile communication network, control to display, on the touch screen, one or more user interface items that respectively correspond to the identified one or more WLANs during the video communication with the external device being performed using the mobile communication network, wherein each of the displayed one or more user interface items allows for selecting a corresponding WLAN through which to perform the video communication with the external device, wherein each of the one or more user interface items includes signal strength information for the corresponding WLAN;

based on a touch interaction, through the touch screen, involving a user interface item of the displayed one or more user interface items during the video communication being performed using the mobile communication network, control to display, on the touch screen, a user interface for obtaining information for connecting to a WLAN corresponding to the user interface item involved in the touch interaction;

during the video communication with the external device being performed using the mobile communication network, control to initiate based on the obtained information, an operation to change a communication network for the video communication from the mobile communication network to the WLAN corresponding to the user interface item involved in the touch interaction; and control to perform, with the external device using the changed-to WLAN, the video communication which has been performed using the mobile communication network, the video communication being performed using the changed-to WLAN comprising sending video communication data towards the external device through a WLAN communication interface of the electronic device and receiving video communication data originating from the external device through the WLAN communication interface of the electronic device, wherein video communication data sent towards the external device includes image data obtained through the camera of the electronic device.

26. The electronic device of claim 25, wherein each of the displayed one or more user interface items further comprises at least one of type information or an alphanumeric identifier for a corresponding WLAN.

27. The electronic device of claim 25, wherein, when a plurality of user interface items is displayed, the plurality of user interface items is consecutively displayed one below another.

28. The electronic device of claim 25, wherein the touch interaction involving the user interface item comprises a first touch input, received through the touch screen, for the user interface item for selecting the corresponding WLAN and a second touch input, received through the touch screen, for connecting to the corresponding WLAN.

29. The electronic device of claim 28, wherein the selection of the WLAN is canceled based on an input received while the user interface item corresponding to the WLAN is displayed.

30. The electronic device of claim 25, wherein the processor is configured to execute the instructions further to control to change the communication network for the video communication from the changed-to WLAN to one of the mobile communication network or another mobile communication network based on the electronic device being outside of a service coverage area of the changed-to WLAN.

* * * * *